United States Patent [19]

Evans

[11] Patent Number: 4,536,456

[45] Date of Patent: Aug. 20, 1985

[54] TELLURIUM-CONTAINING CATHODES FOR NONAQUEOUS CELLS

[75] Inventor: William P. Evans, Rocky River, Ohio

[73] Assignee: Union Carbide Corporation, Danbury, Conn.

[21] Appl. No.: 509,023

[22] Filed: Jun. 29, 1983

[51] Int. Cl.³ .................. H01M 4/02; H01M 10/40
[52] U.S. Cl. .................... 429/194; 429/218; 252/182.1
[58] Field of Search .............. 429/194, 218; 252/182.1

[56] References Cited

U.S. PATENT DOCUMENTS 4,085,259  4/1978  Lauck ........................... 429/194

OTHER PUBLICATIONS

*Chemical Abstracts;* Ohzuku et al., vol. 90, 26,003(m), 1978.
*Chemical Abstracts;* Takehara et al., vol. 93, 139,837(s), 1979.
*Chemical Abstracts;* Harai, vol. 87, 210,221(v), 1977.

Primary Examiner—Anthony Skapars
Attorney, Agent, or Firm—Cornelius F. O'Brien

[57] ABSTRACT

A tellurium-containing cathode for nonaqueous cells employing tellurium in the +4 oxidation state such as $TeO_2$, $Te_2MoO_7$, $TeO_2 \cdot xBi_2O_3$ wherein x is from 0 to about 8, $Sb_2TeO_5$ and $Sb_2TeO_7$.

8 Claims, 7 Drawing Figures

TELLURIUM-CONTAINING CATHODES FOR NONAQUEOUS CELLS

DESCRIPTION OF THE INVENTION

1. Technical Field

The invention relates to a solid cathode material for nonaqueous cells, said cathode material comprising tellurium in the +4 oxidation state. Specifically, the invention relates to a solid cathode, such as $TeO_2$, $Te_2MoO_7$, $TeO_2 \cdot xBi_2O_3$, wherein x is from 0 to about 8, $Sb_2TeO_5$ and $Sb_2TeO_7$, for use with a highly active metal anode, such as lithium, and a liquid organic electrolyte, such as 3-methyl-2-oxazolidone in conjunction with a cosolvent and a selected solute.

2. Background of the Art

The development of high energy battery systems requires the compatibility of an electrolyte possessing desirable electrochemical properties with highly reactive anode materials, such as lithium, calcium, sodium and the like, and the efficient use of high energy density cathode materials. The use of aqueous electrolytes is precluded in these systems since the anode materials are sufficiently active to react with water chemically. It has, therefore, been necessary in order to realize the high energy density obtainable through use of these highly reactive anodes and high energy density cathodes to turn to the investigation of nonaqueous electrolyte systems and more particularly to nonaqueous organic electrolyte systems. A large number of nonaqueous organic electrolyte solutions is taught in the art which can be used for many battery systems.

Although a large number of known solid cathode materials is suitable for nonaqueous cell systems, there is always a need for new solid cathode materials to help fill the demand created by the large number of battery-powered devices being marketed. For example, the toy industry has embarked upon a program of marketing a multiplicity of computerized games some of which are educational in nature. Many of these devices require portable power sources and, therefore, any new cell system would be welcomed.

It is an object of the present invention to provide new solid cathode materials for nonaqueous cell systems.

It is another object of the present invention to provide new nonaqueous cell systems employing new solid cathode materials comprising tellurium in the +4 oxidation state.

It is another object of the present invention to provide new solid cathodes such as $TeO_2$, $Te_2MoO_7$, $TeO_2 \cdot xBi_2O_3$, wherein x is from 0 to about 8, $Sb_2TeO_5$ and $Sb_2TeO_7$ for use in nonaqueous cell systems.

It is another object of the present invention to provide a new nonaqueous cell system employing an active metal anode, an organic electrolyte based on 3-methyl-2-oxazolidone and an active cathode such as $TeO_2$, $Te_2MoO_7$, $TeO_2 \cdot xBi_2O_3$ wherein x is from 0 to about 8, $Sb_2TeO_5$ and $Sb_2TeO_7$.

DISCLOSURE OF THE INVENTION

The invention is directed to a new solid cathode material for nonaqueous electrochemical cell systems in which the cathode material comprises tellurium in the +4 oxidation state. Preferable cathode materials for use in this invention can be selected from the group consisting of $TeO_2$, $Te_2MoO_7$, $TeO_2 \cdot xBi_2O_3$, wherein x is from 0 to about 8, $Sb_2TeO_5$ and $Sb_2TeO_7$.

$Te_2MoO_7$ can be prepared by grinding a suitable amount of $TeO_2$ and $MoO_3$ in a mortar and then heating the mixture in a furnace at an elevated temperature for a time period sufficient for the following reaction to occur:

$$2TeO_2 + MoO_3 \rightarrow Te_2MoO_7$$

Generally, the reactants ($TeO_2$ and $MoO_3$) can be heated in a furnace between about 500° C. and about 800° C. for between about 6 and about 18 hours, preferably about 600° C. for about 16 hours. The fused product can then be ground to a powder and formed into an electrode using, if required, a suitable binder and/or conductive agent.

$Sb_2TeO_5$ and $Sb_2TeO_7$ can be prepared in a similar manner by mixing the required amounts of $TeO_2$ with either $Sb_2O_3$ or $Sb_2O_5$ to yield the products according to the following respective reactions:

$$TeO_2 + Sb_2O_3 \rightarrow Sb_2TeO_5$$

$$TeO_2 + Sb_2O_5 \rightarrow Sb_2TeO_7$$

Generally, the required amount of each reactant can be mixed and then heated at an elevated temperature for a time period sufficient for the appropriate reaction to occur. Usually, the mixture can be heated between about 500° C. and about 800° C. for between about 1.5 and about 5 hours, preferably about 600° C. for about 2.5 hours. The fused product can then be ground to a powder and formed into an electrode using, if required, a suitable binder and/or conductive agent. It was noted from a comparison of an X-ray diffraction pattern of $Sb_2TeO_5$ and an X-ray diffraction pattern of $Sb_2TeO_7$ that the two materials appeared quite similar except that $Sb_2TeO_7$ appeared to have a slight excess of $TeO_2$.

$TeO_2 \cdot xBi_2O_3$ compounds (material) as used herein can be prepared from various ratios of $TeO_2$ to $Bi_2O_3$ wherein x is from 0 to about 8 and preferably from 0 to about 3. The mixture can then be ground and heated at a temperature of between about 800° C. and about 1000° C. for a time period of between about 0.5 hour and about 4 hours. Generally the mixture can be heated at about 900° C. for about 1.5 hours to yield $TeO_2 \cdot xBi_2O_3$ compounds (materials) wherein x is from 0 to about 3, for example, wherein x is 0.4, 1.0 and 3 as disclosed above.

The $TeO_2 \cdot xBi_2O_3$ materials so produced can be ground to a powder and formed into an electrode using, if required, a suitable binder and/or conductive agent.

Although the above illustrations are mainly concerned with cathode materials made by fusion of the respective oxides, it is also within the scope of this invention to prepare the cathode materials containing tellurium in the +4 oxidation state using chemical methods or by preparing physical mixtures of materials containing tellurium in the +4 oxidation state with other oxide materials or sulfide materials.

As stated above, other components may be added to the cathode material such as binders, conductive agents, and the like. Suitable binders would include polytetrafluoroethylene, polyethylene, polysulfone, polypropylene and polyamide. Suitable conductive agents would be metal powders or carbonaceous materials such as carbon or graphite.

Useful highly active metal anode materials include aluminum, the alkali metals, alkaline earth metals and alloys of alkali metals or alkaline earth metals with each other and with other metals. The term "alloy" as used herein and in the appended claims is intended to include mixtures, solid solutions, such as lithium-magnesium, and intermetallic compounds, such as lithium monoaluminide. Thè preferred anode materials are aluminum, lithium, sodium, potassium, magnesium, calcium and alloys thereof.

Useful organic solvents employed alone or mixed with one or more other solvents for use in this invention include the following classes of compounds:

Alkylene nitriles: e.g., crotonitrile (liquid range, −51.1° C. to 120° C.)

Trialkyl borates: e.g., trimethyl borate, $(CH_3O)_3B$ (liquid range, −29.3° to 67° C.)

Tetraalkyl silicates: e.g., tetramethyl silicate, $(CH_3O)_4Si$ (boiling point, 121° C.)

Nitroalkanes: e.g., nitromethane, $CH_3NO_2$ (liquid range, −17° to 100.8° C.)

Alkylnitriles: e.g., acetonitrile, $CH_3CN$ (liquid range, −45° to 81.6° C.)

Dialkylamides: e.g., dimethylformamide, $HCON(CH_3)_2$ (liquid range, −60.48° to 149° C.)

Lactams: e.g., N-methylpyrrolidone,

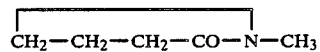
$CH_2-CH_2-CH_2-CO-N-CH_3$ (liquid range, −16° to 202° C.)

Tetraalkylureas: e.g., tetramethylurea, $(CH_3)_2N-CO-N(CH_3)_2$ (liquid range, −1.2° to 166° C.)

Monocarboxylic acid esters: e.g. ethyl acetate (liquid range, −83.6° to 77.06° C.)

Orthoesters: e.g., trimethylorthoformate, $HC(OCH_3)_3$ (boiling point, 103° C.)

Lactones: e.g., γ (gamma)-butyrolactone,

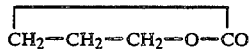
$CH_2-CH_2-CH_2-O-CO$ (liquid range, −42° to 206° C.)

Dialkyl carbonates: e.g., dimethyl carbonate, $OC(OCH_3)_2$ (liquid range, 2° to 90° C.)

Alkylene carbonates: e.g., propylene carbonate,

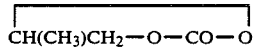
$CH(CH_3)CH_2-O-CO-O$ (liquid range, −48° to 242° C.)

Monoethers: e.g., diethyl ether (liquid range, −116° to 34.5° C.)

Polyethers: e.g., 1,1- and 1,2-dimethoxyethane (liquid ranges, −113.2° to 64.5° C. and −58° to 83° C., respectively)

Cyclic ethers: e.g., tetrahydrofuran (liquid range, −65° to 67° C.); 1,3-dioxolane (liquid range, −95° to 78° C.)

Nitroaromatics: e.g., nitrobenzene (liquid range, 5.7° to 210.8° C.)

Aromatic carboxylic acid halides: e.g., benzoyl chloride (liquid range, 0° to 197° C.); benzoyl bromide (liquid range, −24° to 218° C.)

Aromatic sulfonic acid halides: e.g., benzene sulfonyl chloride (liquid range, 14.5° to 251° C.)

Aromatic phosphonic acid dihalides: e.g., benzene phosphonyl dichloride (boiling point, 258° C.)

Aromatic thiophosphonic acid dihalides: e.g., benzene thiophosphonyl dichloride (boiling point, 124° C. at 5 mm)

Cyclic sulfones: e.g., sulfolane,

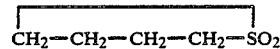
$CH_2-CH_2-CH_2-CH_2-SO_2$ (melting point, 22° C. 3-methylsulfolane (melting point, −1° C.)

Alkyl sulfonic acid halides: e.g., methanesulfonyl chloride (boiling point, 161° C.)

Alkyl carboxylic acid halides: e.g., acetyl chloride (liquid range, −112° to 50.9° C.); acetyl bromide (liquid range, −96° to 76° C.); propionyl chloride (liquid range, −94° to 80° C.)

Saturated heterocyclics: e.g., tetrahydrothiophene (liquid range, −96° to 121° C.); 3-methyl-2-oxazolidone (melting point, 15.9° C.)

Dialkyl sulfamic acid halides: e.g., dimethyl sulfamyl chloride (boiling point, 80° C. at 16 mm)

Alkyl halosulfonates: e.g., ethyl chlorosulfonate (boiling point, 151° C.)

Unsaturated heterocyclic carboxylic acid halides: e.g., 2-furoyl chloride (liquid range, −2° to 173° C.)

Five-membered unsaturated heterocyclics: e.g. 3,5 dimethylisoxazole (boiling point, 140° C.); 1-methylpyrrole (boiling point, 114° C.); 2,4-dimethylthiazole (boiling point, 144° C.); furan (liquid range, −85.65° to 31.36° C.)

Esters and/or halides of dibasic carboxylic acids; e.g., ethyl oxalyl chloride (boiling point, 135° C.

Mixed alkyl sulfonic acid halides and carboxylic acid halides, e.g., chlorosulfonyl acetyl chloride (boiling point, 98° C. at 10 mm)

Dialkyl sulfoxides: e.g., dimethyl sulfoxide (liquid range, 18.4° to 189° C.)

Dialkyl sulfates: e.g., dimethylsulfate (liquid range, −31.75° to 188.5° C.)

Dialkyl sulfites: e.g., dimethylsulfite (boiling point, 126° C.)

Alkylene sulfites: e.g., ethylene glycol sulfite (liquid range, −11° to 173° C.)

Halogenated alkanes: e.g., methylene chloride (liquid range, −95° to 40° C.); 1,3-dichloropropane (liquid range, −99.5° to 120.4° C.)

Of the above, the preferred solvents are sulfolane; crotonitrile; nitrobenzene; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone, propylene carbonate, 1,1- and 1,2-dimethoxyethane, and 1,3-dioxolane because they appear more chemically inert to battery components and have wide liquid ranges, and especially because they permit highly efficient utilization of the cathode materials.

One particular electrolyte for use in this invention is a 3-methyl-2-oxazolidone-based electrolyte. Liquid organic 3-methyl-2-oxazolidone material,

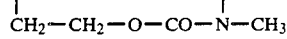

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Me—THF) dioxolane (DIOX), dimethoxyethane (DME), propylene carbonate (PC), dimethyl isoxazole (DMI), diethyl carbonate (DEC), ethylene glycol sulfite (EGS), dioxane, dimethyl sulfite (DMS) or the like. Dimethoxyethane (DME), dioxolane (DIOX) and propylene carbonate (PC) are preferred cosolvents because of their compatibility with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron pairs. The basic concept is set forth in the chemical literature (Journal of the Franklin Institute, Vol. 226—July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, boron bromide, phosphorous pentafluoride, arsenic pentafluoride and antimony pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE 1

Figure 1:
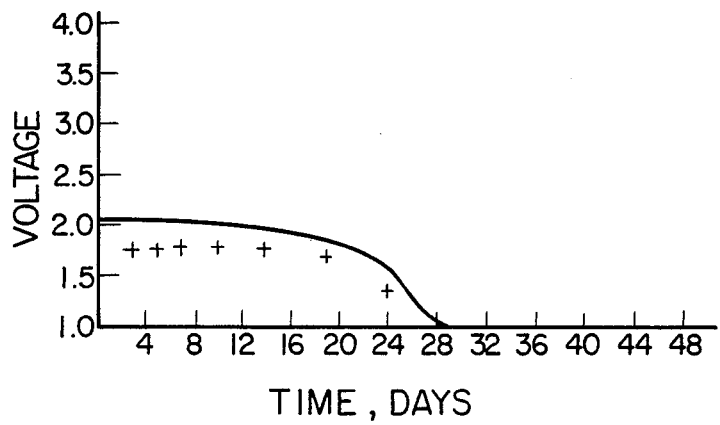
FIGS. 1 to 7 contain data showing the discharge characteristics of the cell disclosed and described in Examples 1 to 7, respectively.

$TeO_2$ was heated at about 900° C. for about 1.5 hours and then ground to pass through a 100 Tyler mesh size screen. The $TeO_2$ was mixed with carbon and polytetrafluoroethylene in a weight ratio of 85:10:5, respectively, to form a cathode mix. 0.36 gram of the cathode mix was pressed into a stainless steel support ring and assembled along with 0.226 gram of lithium; a non-woven fiberglass separator and 2.0 milliliters of an electrolyte consisting of about 40 vol. % dioxolane, about 30 vol. % dimethoxyethane (DME), about 30 vol. % 3Me2Ox plus about 0.1% dimethylisoxazole (DMI) and 1M $LiCF_3SO_3$ to form a nonaqueous cell. The experimental cell was discharged across a 15K-ohm load and the voltage readings observed with time are shown as the curve in FIG. 1. In addition, at various time intervals, the cell was discharged across a superimposed 1K-ohm load (pulse discharge) for two seconds and the voltage readings observed are shown as the points identified as "+" in FIG. 1. This cell delivered a capacity of 79.6 mAh to a 1.2 volt cutoff and 83.6 mAh to a 1.0 volt cutoff.

EXAMPLE 2

Figure 2:
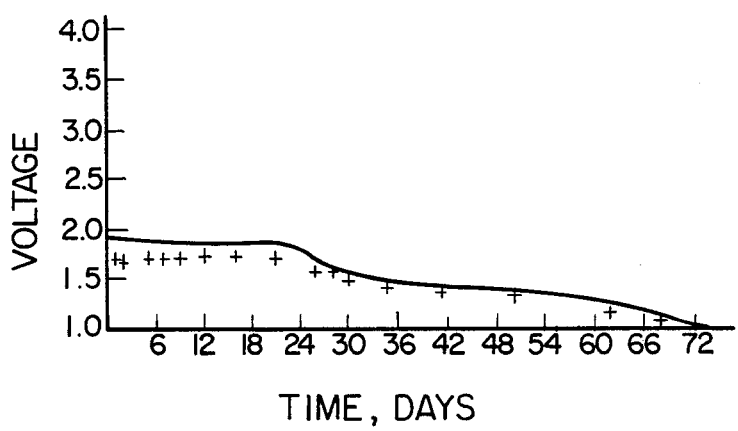

A cell was constructed as in Example 1 using the same components except that $TeO_2$ was replaced with $TeO_2 \cdot 3Bi_2O_3$. The $TeO_2 \cdot 3Bi_2O_3$ had been heated at about 880° C. for about 1.5 hours and then ground to pass through a 100 Tyler mesh size screen and then mixed with carbon and polytetrafluoroethylene in a weight ratio of 85:10:5, respectively, to form a cathode mix. A 0.46 gram cathode was then assembled with the other components as described in Example 1 to produce a cell. The experimental cell was discharged across a 15K-ohm load and the voltage readings observed with time are shown as the curve in FIG. 2. In addition, at various time intervals, the cell was discharged across a superimposed 1K-ohm load (pulse discharge) for two seconds and the voltage readings observed are shown as the points identified as "+" in FIG. 2. This cell delivered a capacity of 166.3 mAh to a 1.2 volt cutoff and 178.9 mAh to a 1.0 volt cutoff.

EXAMPLE 3

Figure 3:
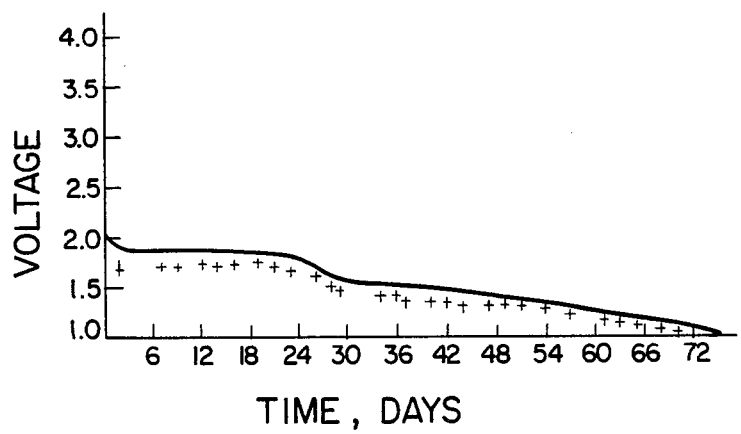

A cell was constructed as in Example 1 using the same components except that $TeO_2$ was replaced with $TeO_2 \cdot Bi_2O_3$ and the amount of the electrolyte was changed to 1.5 milliliters. The $TeO_2 \cdot Bi_2O_3$ had been prepared by heating the reactants at about 900° C. for about 1.5 hours. The material formed was ground to pass through a 100 Tyler mesh size screen and then mixed with carbon and polytetrafluoroethylene in a weight ratio of 85:10:5, respectively, to form a cathode mix. A 0.40 gram cathode was then assembled with the other components as described in Example 1 to produce a cell. The experimental cell was discharged across a 15 K-ohm load and the voltage readings observed with time are shown as the curve in FIG. 3. In addition, at various time intervals, the cell was discharged across a superimposed 1 K-ohm load (pulse discharge) for two seconds and the voltage readings observed are shown as the points identified as "+" in FIG. 3. This cell delivered a capacity of 164.2 mAh to a 1.2 volt cutoff and 182.9 mAh to a 1.0 volt cutoff.

EXAMPLE 4

Figure 4:
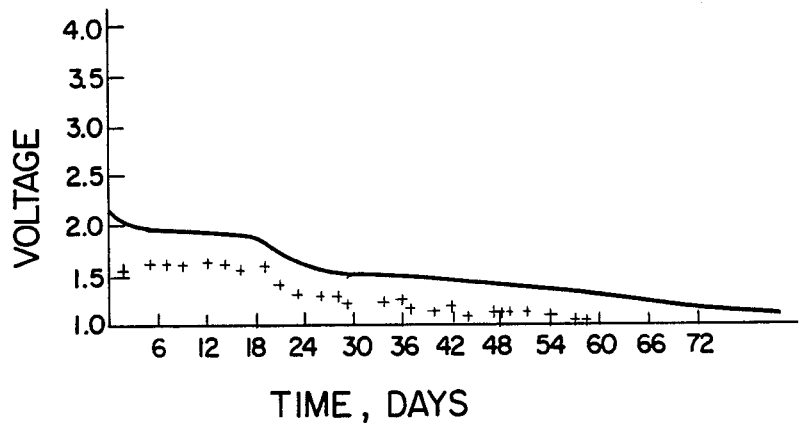

A cell was constructed as in Example 1 using the same components except that $TeO_2$ was replaced with $TeO_2 \cdot 0.4\ Bi_2O_3$ and the amount of the electrolyte was changed to 1.5 milliliters. The $TeO_2 \cdot 0.4\ Bi_2O_3$ had been prepared by heating the reaction at about 900° C. for about 1.5 hours. The material formed was ground to pass through a 100 Tyler mesh size screen and then mixed with carbon and polytetrafluoroethylene in a weight ratio of 85:10:5, respectively, to form a cathode mix. A 0.40 gram cathode was then assembled with the other components as described in Example 1 to produce a cell. The experimental cell was discharged across a 15K-ohm load and the voltage readings observed with time are shown as the curve in FIG. 4. In addition, at various time intervals, the cell was discharged across a superimposed 1K-ohm load (pulse discharge) for two seconds and the voltage readings observed are shown as the points identified as "+" in FIG. 4. This cell delivered a capacity of 174.0 mAh to a 1.2 volt cutoff and 209.8 mAh to a 1.0 volt cutoff.

EXAMPLE 5

Figure 5:
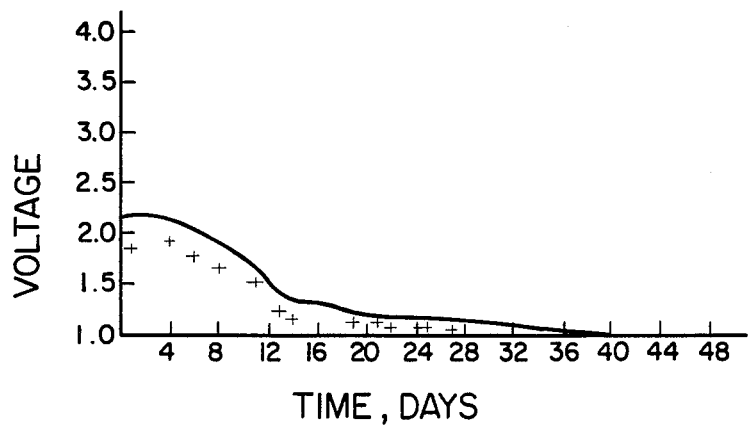

A cell was constructed as in Example 1 using the same components except that $TeO_2$ was replaced with $Sb_2TeO_7$. The $Sb_2TeO_7$ had been prepared by heating the reactants at about 600° C. for about 2.5 hours. The material formed was ground to pass through a 100 Tyler mesh size screen and mixed with carbon and polytetrafluoroethylene in a weight ratio of 85:10:5, respectively, to form a cathode mix. A 0.35 gram cathode was then assembled with the other components as described in Example 1 to produce a cell. The experimental cell was discharged across a 15K-ohm load and the voltage readings observed with time are shown as the curve in FIG. 5. In addition, at various time intervals, the cell was discharged across a 1K-ohm (pulse discharge) for two seconds and the voltage readings observed are shown as the points identified as "+" in FIG. 5. This cell delivered a capacity of 56.9 mAh to a 1.2 volt cutoff and 89.5 mAh to a 1.0 volt cutoff.

EXAMPLE 6

Figure 6:
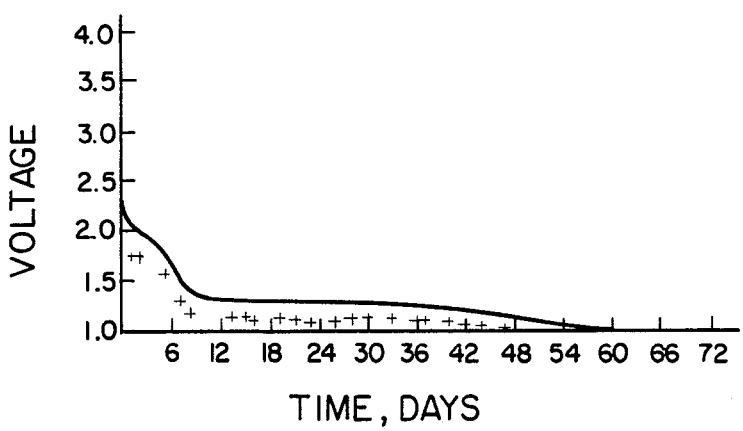

A cell was constructed as in Example 1 using the same components except that $TeO_2$ was replaced with $Sb_2TeO_5$. The $Sb_2TeO_5$ had been prepared by heating the reactants at about 600° C. for about 2.5 hours. The material formed was ground to pass through a 100 Tyler mesh size screen and then mixed with carbon and polytetrafluoroethylene in a weight ratio of 85:10:5, respectively, to form a cathode mix. A 0.36 gram cathode was then assembled with the other components as described in Example 1 to produce a cell. The experimental cell was discharged across a 15K-ohm load and the voltage readings observed with time are shown as the curve in FIG. 6. In addition, at various time intervals, the cell was discharged across a 1K-ohm (pulse discharge) for two seconds and the voltage readings observed are shown as the points identified as "+" in FIG. 6. This cell delivered a capacity of 92.9 mAh to a 1.2 volt cutoff and 125.1 mAh to a 1.0 volt cutoff.

EXAMPLE 7

Figure 7:
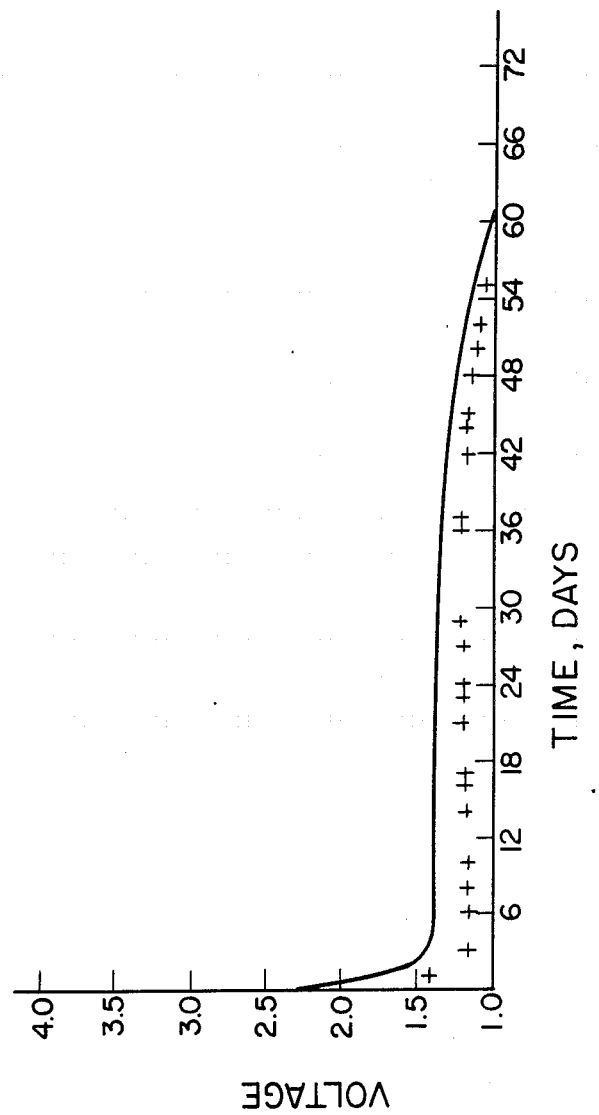

A cell was constructed as in Example 1 using the same components except that a non-woven polypropylene separator was used and that $TeO_2$ was replaced with $Te_2MoO_7$, the amount of the electrolyte was changed to 1.5 milliliters and the amount of lithium was changed to 0.092 gram. The $Te_2MoO_7$ had been prepared by heating the reactants at about 600° C. for about 16 hours. The material formed was ground to pass through a 100 Tyler mesh size screen and then mixed with carbon and polytetrafluoroethylene in a weight ratio of 85:10:5, respectively, to form a cathode mix. A 0.234 gram cathode was then assembled with the other components as described in Example 1 to produce a cell. The experimental cell was discharged across a 15K-ohm load and the voltage readings observed with time are shown as the curve in FIG. 7. In addition, at various time intervals, the cell was discharged across a superimposed 1K-ohm (pulse discharge) for two seconds and the voltage readings observed was shown as the points identified as "+" in FIG. 7. This cell delivered a capacity of 110.4 mAh to a 1.2 volt cutoff and 129.5 mAh to a 1.0 volt cutoff.

While the present invention has been described with reference to specific cathode materials, it is not intended that these specific cathode materials shall be construed as limiting the scope of this invention.

What is claimed is:

1. A solid cathode material for nonaqueous cells comprising a fused material selected from the group consisting of $Te_2MoO_7$, $TeO_2 \cdot xBi_2O_3$ wherein x is from greater than 0 to about 8, $Sb_2TeO_5$ and $Sb_2TeO_7$.

2. The solid cathode material of claim 1 wherein x in the $TeO_2 \cdot xBi_2O_3$ material is from greater than 0 to about 3.

3. The solid cathode material of claim 2 wherein x in the $TeO_2 \cdot xBi_2O_3$ material is 1.

4. The solid cathode material of claim 2 wherein x in the $TeO_2 \cdot xBi_2O_3$ material is 0.4.

5. The solid cathode material of claim 1 wherein the cathode material further comprises a conductive agent and a binder.

6. A nonaqueous cell comprising the solid cathode material of claim 5, an organic electrolyte solution and an active metal anode.

7. The nonaqueous cell of claim 6 wherein the active metal anode is selected from the group consisting of aluminum, lithium, sodium, potassium, magnesium, calcium and alloys thereof.

8. The nonaqueous cell of claim 7 wherein said active metal anode is lithium.

* * * * *